(12) United States Patent
Moon et al.

(10) Patent No.: US 11,611,730 B2
(45) Date of Patent: Mar. 21, 2023

(54) MODULAR LED IMAGING PROJECTOR AND OPTICAL SYSTEMS

(71) Applicants: Brian Robert Moon, Woodbridge, VA (US); John W. Luhrs, Marietta, GA (US)

(72) Inventors: Brian Robert Moon, Woodbridge, VA (US); John W. Luhrs, Marietta, GA (US)

(*) Notice: Subject to any disclaimer, the term of this patent is extended or adjusted under 35 U.S.C. 154(b) by 0 days.

(21) Appl. No.: 17/173,652

(22) Filed: Feb. 11, 2021

(65) Prior Publication Data

US 2021/0250562 A1    Aug. 12, 2021

Related U.S. Application Data

(60) Provisional application No. 62/972,777, filed on Feb. 11, 2020.

(51) Int. Cl.
*H04N 9/31* (2006.01)
*G03B 21/20* (2006.01)
*G02B 27/30* (2006.01)

(52) U.S. Cl.
CPC ....... *H04N 9/3152* (2013.01); *G03B 21/2033* (2013.01); *H04N 9/3164* (2013.01); *G02B 27/30* (2013.01)

(58) Field of Classification Search
CPC ............... H04N 9/3152; H04N 9/3164; G03B 21/2033; G03B 21/20; G02B 27/30; F21V 21/30; F21V 14/08; F21V 17/002; F21V 19/04; F21V 9/08; F21Y 2115/10; F21W 2131/406

USPC ....................................................... 348/744
See application file for complete search history.

(56) References Cited

U.S. PATENT DOCUMENTS

| | | | |
|---|---|---|---|
| 2,650,292 A | 8/1953 | Strong | |
| 2,950,382 A | 8/1960 | Hatch | |
| 2010/0204841 A1* | 8/2010 | Chemel | H05B 45/20 700/282 |
| 2011/0164416 A1* | 7/2011 | Pujol | F21V 7/24 362/296.01 |
| 2011/0182053 A1* | 7/2011 | Khan | F21V 29/763 362/249.02 |
| 2012/0212929 A1* | 8/2012 | Li | G03B 21/208 362/555 |
| 2013/0200795 A1 | 8/2013 | Clark et al. | |
| 2020/0236759 A1* | 7/2020 | Jurik | H05B 47/28 |

FOREIGN PATENT DOCUMENTS

| | | | |
|---|---|---|---|
| CN | 204806277 | 11/2015 | |
| CN | 209540572 U | * 10/2019 | |
| CN | 210662442 | 6/2020 | |
| WO | WO-0184043 A1 | * 11/2001 | ............ F21S 10/007 |

* cited by examiner

*Primary Examiner* — Michael Lee
(74) *Attorney, Agent, or Firm* — Thomas Horstemeyer, LLP

(57) ABSTRACT

The disclosure relates to modular LED imaging projector and optical systems and apparatuses. A light-emitting diode (LED) engine module emits a light beam that is homogenized and focused through a predetermined focal point. The LED engine module is detachably attached to a posterior connection point of a base body assembly. A collimating lens within the base body assembly refocuses the light beam to reduce divergence.

20 Claims, 9 Drawing Sheets

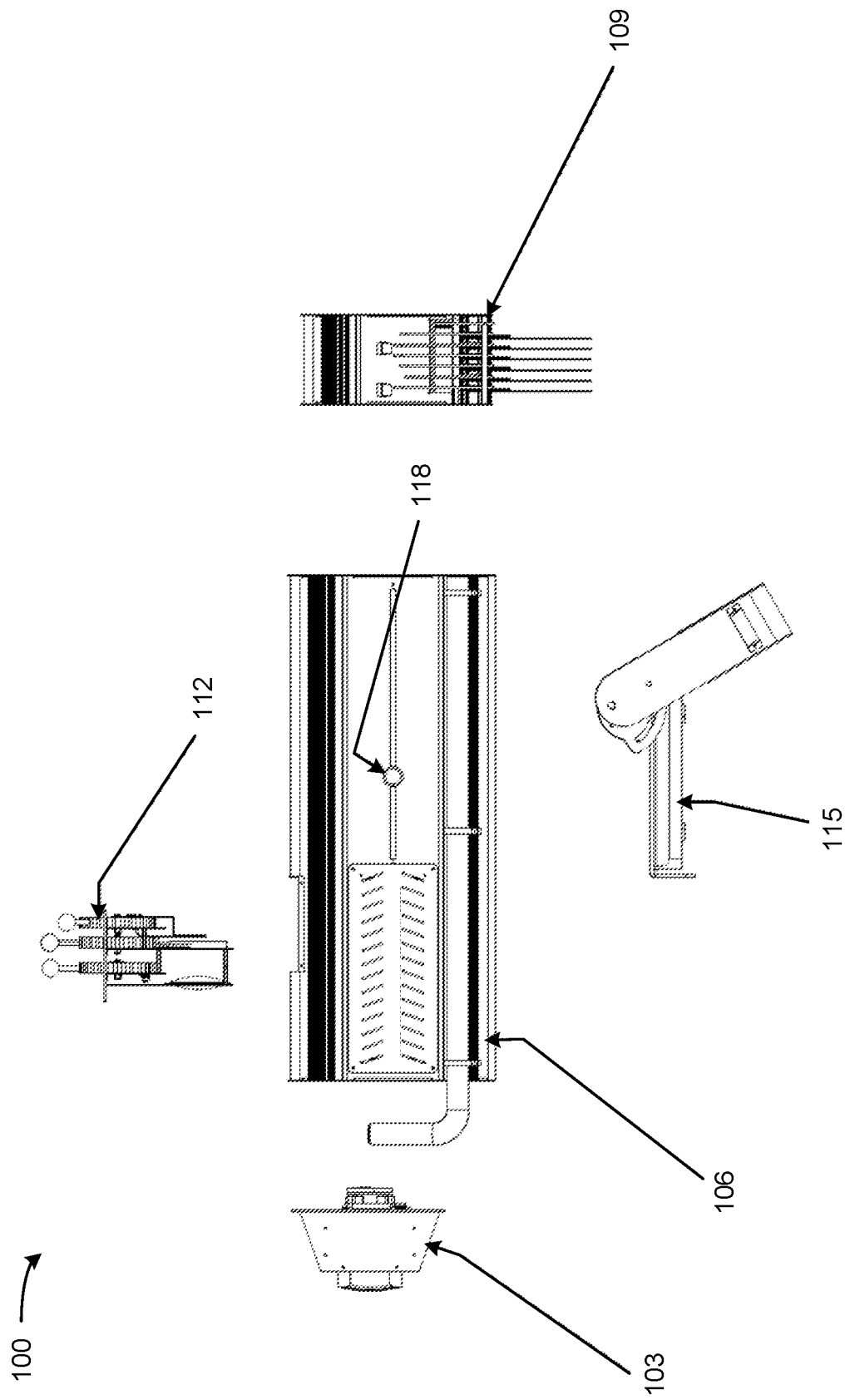

MODULAR LED IMAGING PROJECTOR AND OPTICAL SYSTEMS

CROSS-REFERENCE TO RELATED APPLICATIONS

This application claims priority to and the benefit of U.S. Provisional Application No. 62/972,777, filed on Feb. 11, 2020 and entitled "MODULAR FOLLOWSPOT SYSTEM," which is incorporated herein by reference in its entirety.

BACKGROUND OF THE INVENTION

Many lighting and imaging systems are only good for the intended lamp or lighting source they are initially designed for. Xenon and arc lamps are used in order to get the desired output for long distance projection distances. These systems can be very inefficient, require high wattage, very hot, and only utilize 220V or more for power supply. Many only come in one unchangeable color temperature and color rendering index (CRI). In addition, existing systems are not modular for future upgrades, or require taking apart the yoke and body assemblies. This can be very inefficient and can require multiple people for the teardown and complete rebuilding of the unit. Furthermore, conventional high wattage lamp changes can be dangerous requiring full body safety suit to meet code while changing. Some arc lamps have a tendency to explode. Accordingly, there is a need for a more effective modular system.

BRIEF DESCRIPTION OF THE DRAWINGS

FIG. 1A-1C are drawings that show respective explosion, isometric, and assembled side views of an example modular imaging projector system according to the present disclosure. Similar reference characters denote corresponding features consistently throughout the attached drawings.

SUMMARY

Figure 1B:
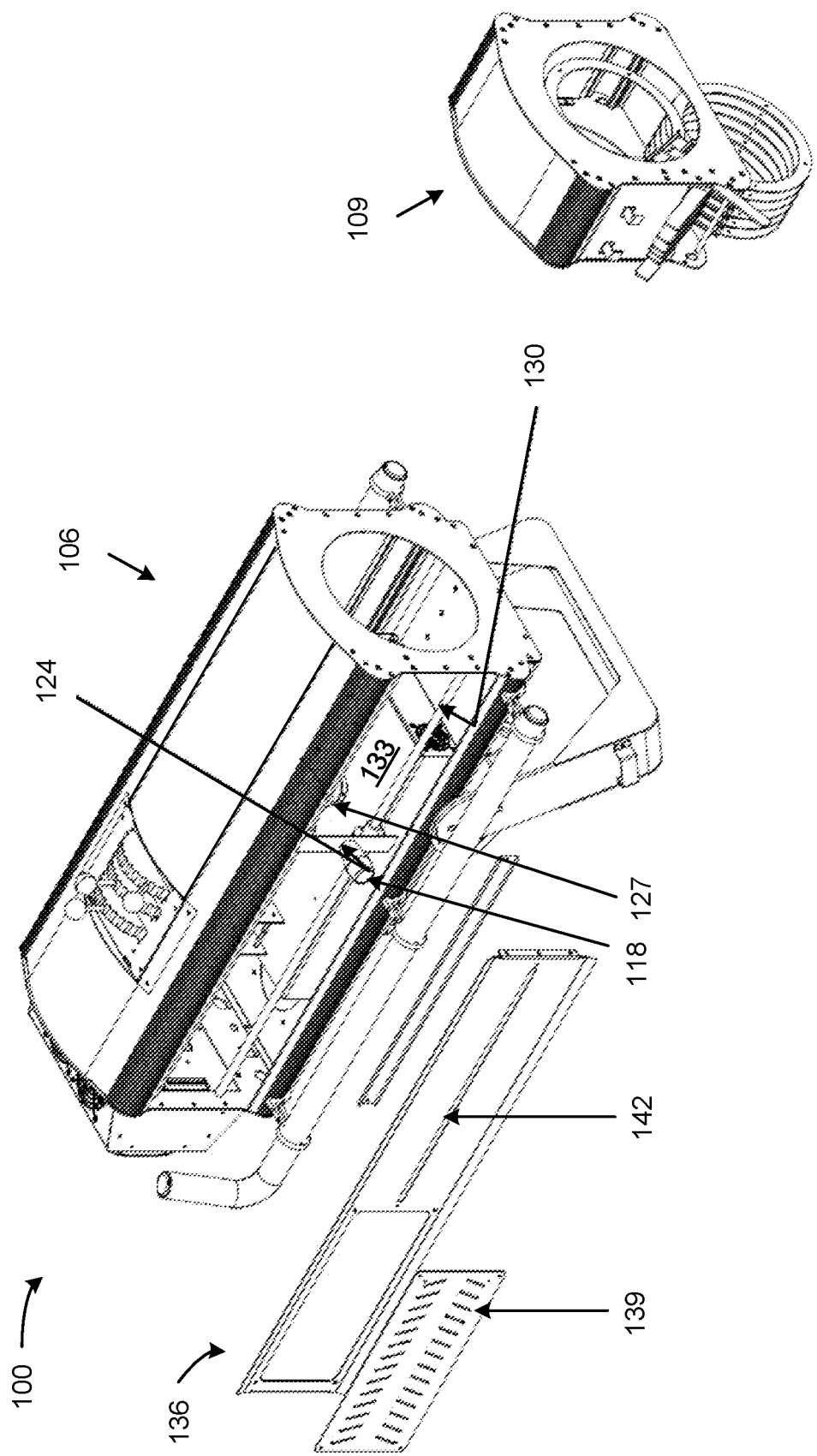

The present disclosure relates to a modular imaging projector system. Existing imaging projector systems are only good for the intended lamp or lighting source, and only come in one unchangeable color temperature and color rendering index (CRI). In addition, existing imaging projector systems are either not modular for future upgrades, or require taking apart the yoke and body assemblies. This can be very inefficient and can require multiple people for the teardown and complete rebuilding of the unit. These solutions can require the end user to hire electrician to service the units. However, the mechanisms described herein provide a modular imaging projector system that allows for removal, upgrade, and replacement of lighting source from a posterior mounting location, without taking apart the yoke assembly module 115, and without taking apart the body assembly or housing of the modular imaging projector system.

FIG. 1A shows an explosion view of an example modular imaging projector system 100 according to the present disclosure. The modular imaging projector system 100 can include a modular LED engine module 103, a base body assembly 106 and, as well as one or more of a color changer or lighting effect module 109, a control module 112, and an adjustable yoke assembly module 115, among other options. In some examples, the base body assembly 106 can include a base body lens adjuster handle 118 and/or a lever that moves a base body lens assembly distally and proximally from the modular LED engine module 103, along a length of the base body assembly 106. In other words, the base body lens adjuster handle 118 can adjust a zoom and/or throw of the modular imaging projector system 100 by moving the base body lens assembly towards an anterior or towards a posterior of the base body assembly 106.

LED engine module 103 can include a housing that includes various components that are discussed. For example, an LED imaging projector or light source with one or more LED Arrays, or single LED chip. The LED engine module 103 can also include integrated or other condensing optics, fly eye lens, BCX Lens, and collimating optics in order to create a pre-collimated and homogenized LED light Beam focusing down to a desired size and focused on a predetermined focal point, for example to an approximately 30 mm diameter beam or smaller at a predetermined distance from the LED engine module 103. The LED engine module 103 can include a fiber optic LED component, an injection molded optical component, or a special purpose component to create a pre-collimated and/or homogenized light beam combining one or multiple LED sources down into a desired size and focused on a predetermined focal point at a predetermined distance from the LED engine module 103.

The LED engine module 103 can also include a heat dissipation assembly and components including thermistor, fans, and heatsink for cooling of an LED light source and other components of the LED engine module 103, as well as temperature sensors monitoring the LED array temperature in order to adjust speed of fans depending on a detected junction temperature of the LED array.

The LED engine module 103 can also include a display component such as an LCD, LED, or other display screen. In some cases, the display can include built in memory and computing device or be connected to a computing device and memory. A user interface can be generated for display on the screen. The screen can include information such as: hours of usage on LED array, color temp and CRI, firmware version, digital multiplex signal (DMX) address or channel, and other information.

This allows touring companies or other users of the modular LED imaging projector system 100 to use a single LED Engine with desired color temp and CRI, and can install or configure various different configurations, for example, to provide a particular configuration associated with a particular venue. The display component of the LED engine can enable additional features of DMX control and provide for added flexibility. In some examples, for simplified control schemes, a standard LED driver with a manual dimming potentiometer used to control amperage output of LED driver can be included in place of a fully integrated DMX and Manual Dimming Power Supply. The dimmer handle can include rotation that is not around a tubular or other centerline or axis of the base body assembly 103. For example, the dimmer handle can rotate about an axis provided by a gear or another control mechanism of a control submodule of the control module 112. This can provide greater travel distance and/or greater variability in movement.

An LED imaging projector or light source of the LED engine module 103 can be mounted to LED engine mounting points on a side, top, bottom, back, or internal mounting point of the LED engine module 103. Some configurations can use a redirecting mirror to direct the light towards the front of the imaging plane or focal plane that projects into the base body assembly 106 and aligned with its longitudinal length. The configuration can be chosen based on design characteristics and space requirements of a venue. If an LED engine mounting point is on a back of the LED engine module 103, then the display unit can be placed on a top, side, bottom, or at an angle. LED imaging projector or light source can include an LED imaging projector or gobo projector, a conventional spotlight, or another light source that produces a hard edge and a focused (or focusable) beam of light that can have an image that can be focused (gobo pattern) or variable aperture (iris) or a conventional non adjustable aperture (Annular Piece of material). LED imaging projector or light source can include a single source LED, a chip on board (COB) LED, or multiple source LED array with collimating optics. The LED engine module 103 can include electrical connectors for controls and power of fans, display, the LED light source, and other components of the LED engine module 103. These connectors can mate to power and control connectors of the base body assembly 106, which can house the LED driver and additional power and control electronics.

In some cases, the LED engine mounting points can enable a user to remove the LED imaging projector or light source without removing the LED engine module 103 from the base body assembly 106. Where the LED engine mounting points are internal, an access plate can provide a user with access to the LED engine within the interior of the LED engine module 103 without removing the LED engine module 103 from the base body assembly 106. In other examples, the LED engine can be serviced by removing the LED engine module 103 from the detachably-attached connection point between the posterior of the base body assembly 106 and the anterior of the LED engine module 103. The LED light source and the LED engine module 103 as a whole can be serviced, reconfigured, and/or removed without disassembly of the base body assembly 106, including its housing, access panels, and other connection points (e.g., other than the posterior LED engine module connection point). In some examples, the detachably-attached connection point between the posterior of the base body assembly 106 and the anterior of the LED engine module 103 can enable tool-less and/or single-tool detachment of the LED engine module 103 using fasteners such as thumbscrews, screws, wingnut, slide-lock, press fit, and other connectors that are exposed and/or accessible from an exterior of the modular imaging projector system 100. The LED engine module 103 can also include handles for removing the LED light source and/or LED engine module 103 from the modular imaging projector system 100.

The base body assembly 106 can act as the central hub of both physical and electrical interconnections between all the parts of pieces of the modular imaging projector system 100. For example, the base body assembly 106 can attach to the LED engine module 103, the control module 112, the lighting effect module 109, the yoke assembly module 115, and lens tube modules. Base body assembly 106 and housing can include the LED driver with AC to DC conversion. The base body assembly 106 can also include electrical connectors that electrically connect power and controls from the LED driver and mate to connectors and/or wiring of the LED engine module 103. In addition to the LED driver circuits, the base body assembly 106 can also house electrical power and/or control circuitry connections for electrical components of: the LED engine module 103, the control module 112, the lighting effect module 109, the yoke assembly module 115, and lens tube modules. The base body assembly 106 can include handles for operation in terms of movement, including pan and tilt. The base body assembly 106 can include attachment points to the other modules which can include the LED engine module 103, the control module 112, the lighting effect module 109, the yoke assembly module 115, and lens tube modules.

The base body assembly 106 can include an integrated zoom lens system for varying beam size, throw, and/or zoom for different distances of light. For example, a base body assembly 106 can house a modular movable primary lens set up that has a mechanical lever to bring the lens assembly into and out of the focal plane, therefore creating an optional adjustable zoom lens assembly. In some cases, this can include a "droppable" lens that has a horizontal bearing assembly to allow adjustment, which can cause the beam to have a bigger or smaller diameter optically. In further cases, this can also include a user-selectable "droppable" primary lens, for example, within the base body. When selected and placed in the light beam or field, the selectable base body lens can be the primary lens, and a lens tube module lens within a lens tube module is a secondary lens. On the other hand, when the selectable base body lens is de-selected or moved out of the field of light, the lens tube module lens can be the primary lens.

A filter, gel, or lighting effect module 109 can be mounted to an anterior connection point of the base body assembly 106. In some examples, any length or type of lens tube module (e.g., a long throw, medium throw, or short throw lens tube module) can be mounted to an anterior connection point of the lighting effect module 109, such that the lighting effect module 109 is between the base body assembly 106 and a lens tube module. In other examples, a lens tube module can be mounted to the anterior connection point of the base body assembly 106, and the gel module can be mounted to the anterior connection point of the lens tube module such that the lens tube module is between the base body assembly 106 and the lighting effect module 109. The lighting effect module 109 can hold a number of changeable or permanently mounted gel frames for use of placing in colored translucent or frosted material in order to change the color of a single white light source. The gel changer module 109 can include a mechanical release mechanism, gel frame, gel and handle to bring it into the path of the light. The lighting effect module 109 can include any kind of lighting or imaging effects including color effects, dimming effects, diffusion effects, and effects to warm up, cool down, and otherwise correct white light, remove undesirable tints, and/or reduce light levels. This can be achieved using gels, filters, and any kind of material held in the path of the light beam using the lighting effect module 109. The lighting effect module 109 can also be mounted in the middle between the Iris/Aperture and the primary lens (and/or secondary lens) depending on the set up of the modular imaging projector system 100. For example, where the primary lens and/or secondary lens is housed in one or more lens tube module. The lighting effect module 109 can also include a gel changer that can enable a user to engage and disengage a number of changeable frames, each holding a particular gel or lighting filter. The lighting effect module 109 can also include electronic or manually controlled devices to change and mix multiple effects and colors to a desired effect. For example, a dichroic color- (and/or other effect-) mixing system can provide a customized color as well as other effects discussed. A static frame system can be used, or an changeable frame system can be used for the color and other effects. Changeable frame systems can include a scroller type device that can scroll through individual effects or sets of effects. Changeable frame systems can also engage and disengage a number of changeable effect frames including gels, diffusions, and others as discussed. Effects can also include frost, lenticular frost, gel color and neutral density as well as dichroic glass and dichroic color mixing system.

Control Panel Module 112 can include the optical lens such as a biconvex (BCX) lens, plano convex (PCX) lens, or a lens stack. This allows the optical lens to be serviced removed and replaced by removing the control panel module 112 from the top (or side) mounting point of the base body assembly 106 without disassembly of the housing or other connection points of the base body assembly 106. The control panel module 112 can include light control submodules including one or more of an electronic manual dimmer, chopper blades, a gobo pattern holder, an iris for varying aperture size such as a non-zeroing iris that prevents inadvertent blackouts, framing shutters, a zeroing iris, and a physical or electronic macro button that quickly configures the light beam modification components to a predetermined setting or a time-varying setting such as a flicker, a gradual dimming to blackout, or an abrupt timeout with a particular timing. All these submodules can include corresponding controls that are exposed to a user outside of the control panel module 112.

The control panel module 112 can include a number of control submodule connection points that receive and hold the control submodules. By selecting and placing the control submodules in a desired control submodule connection point of the control panel module 112, a customizable configuration can be achieved. For example, if the end user prefers the dimmer controller to be closest to the front of the modular imaging projector system 100 and not the back, it can be easily moved around with simply removing a few screws to swap around modules into a number of preformed or custom-placed control submodule placement positions within the control panel module 112. In some cases, the modular imaging projector system 100 can be configured according to a pre-existing or previous imaging projector that is to be replaced by the modular imaging projector system 100.

Dimmer Control can include electronically dimming the LED array in the LED Engine via a rotary potentiometer (which ties into LED Driver assembly) with optional handle mount for operation. Dimmer Control: can include rotary potentiometer, linear potentiometer, or other potentiometers tied into a lever type system. Such a lever system can also be adjustable based on where the end of the potentiometers is placed. This arrangement can provide options of range of motion depending on end application and user specifications. Iris Control can include a control interface that allows an operator to adjust the iris and manipulate beam size. Gobo Pattern Engager can include a lever assembly to move a specific projection pattern, which can be made out of very fine laser cut steel or dichroic glass. The user can either put the "Gobo" into the focal plane or not, depending on the desired need for the show, venue, or application. In other examples, the gobo pattern submodule is not engageable vis a lever, but can slide or otherwise be held placed in the light beam in a fixed manner once placed. The dimmer wheel does not rotate on tubular or other central axis of the unit.

Shutter/Framing Choppers can have a module installed into sub assembly of Controls Panel to have replaced the gobo holder or dimmer wheel. This assembly can include 2 or more different metal blades that can overlap each other, allowing the operator to cut off light from scenery or have a very specific type of optical effect black out.

Lighting effect module 109: This device can have any particular number of mechanically/manually engaged gel, diffusion or other types of optical films that are placed in front of the light to adjust color temp, beam edge, or color tone of the light beam. This particular design can include multiple frames that are all self-cancelling, as compared to a single frame that works independently from the other frames that may contain a frost/diffusion or color correction filter, which may need to stay in the entire time while the other frames may change. The frames that hold the optical film can either be modular for easy removal and swap out depending on shows need, or can be permanently mounted so end user doesn't lose the frames.

Lens Tube Modules: Generally, the lens tube modules can provide a variety of different focal length lenses placed on a linear track system so that the light beam can be focused or beam adjusted in terms of beam diameter, depending on throw distance and desired size of light, whether be projecting a gobo, or lighting a person on stage. The tube can be mounted to the base body assembly 106 directly or with the lighting effect module 109 therebetween, depending on the end users personal preferences of ergonomics as well as desired light beam manipulation.

Lens tube modules can be selected and change based on throw distance of light as well as desired max size of light beam. There can be multiple different configurations that allow the end user to swap out or rearrange in the system to create a specifically desired lighting effect. For example, a long throw lens tube module, medium throw lens tube module, and short throw lens tube module. If the throw is over 150' away to the edge of stage, the long throw lens tube module can be selected and installed, which can include a larger diameter and longer focal length lens in order to project the beam in a narrower beam of light, therefore delivering more lumens at a further distance. The lens tube modules can be changed without disassembly of the base body housing assembly 106 and the LED engine module 103 of the modular imaging projector system 100.

The various lens tube modules can provide for a full range of motion of a lens tube lens through substantially an entire longitudinal length (e.g., any position along 70% or more, 80% or more, 90% or more) of the lens tube module along the light beam. This can enable alterations to accept smaller or larger gel or lighting effect modules that maintain native adjustments range in the lens tubes without requiring a new lens tube system. To this end, a lens tube module can include a housing with a movable lens tube lens set up that has a mechanical lever to bring the lens assembly (that holds the lens) into and out of the focal plane, therefore creating an optional adjustable zoom lens assembly that can enable alterations to accept smaller or larger gel or lighting effect modules that maintain native adjustments range in the lens tubes without requiring a new lens tube system.

The lens train or assembly can have substantially the entire length of the module for travel. This is done so other lenses can be swapped out depending on custom needs and different focal length lenses, but also in cases where an optional primary lens is dropped in the base body assembly 106. Unit therefore turning the static focal length optical assembly to an adjustable focal length assembly (zoom assembly vs single set focal length system).

Basic Elements can include a light blocker for preventing stray light coming out of fixture, 2 or more linear rods with bearings attached to lens holder, allowing horizontal adjustment of the lens, depending on desired lens placement in optical system. Attached to lens holder can be a handle of which you can use to move lens holder back and forth and then rotate clockwise in order to lock down the assembly so it stays in place.

Adjustable yoke assembly module 115: Depending on the configuration of the lens tubes and lighting effect modules, the center of balance can be affected. A desired effect can be to have the entire light fixture assembly balanced in order for smooth operation of the fixture to occur by the operator. In other cases, an operator may prefer a light be rear-heavy or front heavy. The adjustable yoke assembly module 115 can include a slide connection that allows the base body 106 assembly to slide forward and backward relative to an articulation point provided by the adjustable yoke assembly module 115. Rotting knobs or another locking mechanism can lock the unit place once the desired balance by the operator has been achieved. The length and weight of the fixture changes depending on which lens tube and lighting effect configuration, the "pivot gravity" can be recentered by allowing the entire fixture length to slide back and forth. The adjustable yoke assembly module 115 can operate or aim the fixture in a particular direction. The adjustable yoke assembly module 115 can include a connection or attachment point that connects to a bottom, top, or side "yoke" connection point of the base body assembly 106. The yoke connection point can be a reinforced connection point that is reinforced using a reinforcement plate, other reinforcement component, or by providing a thicker connection point in comparison to the other connection points. The adjustable yoke assembly module 115 can include a clamp type or other hanging device that connects to and hangs from an overhead mount, or a tripod or other foot-type device that can sit on the floor via static rubber feet or casters for mobility. In some cases, the adjustable yoke assembly module 115 can securely fasten to a beam that connects to floor mount (or overhead mount). The adjustable yoke assembly module 115 can connect to an overhead, side hanging, bottom support whether free standing such as a tripod or secured to a building or structure such as floor mounted, truss mounted, rail mounted, beam mounted or side mounted unit.

The LED lighting of the modular imaging projector system 100 can be capable of achieving the same amount of light delivered as a high wattage conventional or non-LED light source, using an LED system that can operate at a fraction of that power. For example, an LED system operable using a fraction of the power. It improves dimming by dimming light source electronically, nice and smoothly all the way to 0%, which could not be achieved through a traditional light source based light fixture, which only uses mechanical beam distortion in order to "dim" the light source. By constructing the fixture this particular way allows a single user to assembly the entire fixture together, as opposed to multiple people or even the use of a electro-mechanical device for lighting the entire fixture assembly out of a wooden road case. The modularity solves future update issues. If a different design for the gel or lighting effect occurs, an entire fixture does not need to be purchased or sourced. Each of the components and modules can be easy to replace and upgrade for a base body, and the components can be compatible with upgraded base body assemblies. The components can be updated based upon future design options and based upon the end users needs and facility or venue demands. Because the LED module is included in a module external to the base body housing and assembly, this provides for more efficient and easy swap outs vs. an internal engine that is internal to a LED engine module housing, which would require the end user to open up the entire fixture to swap out the LED Engine, which is usually mounted in a permanent type configuration of a non-modular integrated component that cannot remove the LED light source and its mount (e.g., does not include a removable posterior-mounted modular LED engine module 103).

Potentiometer and/or other dimming components can dim LED (either by PWM or CCR (Pulse Width Modification or Constant Current Reduction)) and can go back to Control Board which will control intensity of LED using an analog signal generated by the potentiometer that can in turn be translated by the LED Driver system and then output to the LED. This can include PWM, CCR or a combination driver using both methods of technology to enable low end dimming control. This can include but is not limited to mechanical dimming.

An iris can come in various different versions including zeroing and non zeroing. Zeroing iris allows the mechanical iris to close all the way, not allowing light to pass thru, also usually uses a series of overlapping frames in order to achieve effect. In terms of focusing, it can be rather difficult to achieve a sharp focus on the 360 of the beam due to the multiple planes in depth, which the lenses would not be able to focus cleanly on.

Non zeroing iris. A single plane set of steel leaves in order to shape the beam, achieving the effect of a smaller aperture or wider aperture, separate from the optical zoom lenses used to make the beam bigger of smaller, depending on placement. Purpose of Iris can be to shape beam, to make light appear bigger or smaller, beyond the max capabilities of the optical zoom lenses. While using a zeroing iris, some system might include no stop mark set as to a minimum setting and can go from light on to no light at all, causing an unintentional black out.

FIG. 1B shows an isometric explosion view of the modular imaging projector system 100 of FIG. 1A. This view provides an internal view of the modular imaging projector system 100. For example, a base-body integrated primary or zoom lens assembly 124 can be provided internal to the base body assembly 106. The base body integrated lens assembly 124 can include a lens holder 127 for a droppable primary, zoom, or another lens. The zoom lens assembly 124 can be placed on and travel with a linear motion along a linear track system 130 so that the light beam can be focused or beam adjusted in terms of beam diameter, depending on throw distance and desired size of light, whether be projecting a gobo, or lighting a person on stage. The base body lens adjuster handle 118 and/or a lever can move the base body integrated lens assembly 124 distally and proximally from the modular LED engine module 103, along a portion of length of the base body assembly 106. In other words, the base body lens adjuster handle 118 can adjust a zoom and/or throw of the modular imaging projector system 100 by moving the base body lens assembly towards an anterior or towards a posterior of the base body assembly 106.

In some cases, the base body integrated lens assembly 124 and/or linear track system 130 can include stops that prevent the lens and lens holder 127 from impacting the components of the control module 112. The base body lens adjuster handle 118 can prevent the lens and lens holder 127 from impacting the components of the control module 112. For example, where a base body integrated lens assembly 124 and linear track system 130 are used within the base body assembly 106, an optional lens assembly side plate 136 can be used on one or both sides of the base body module 106.

The lens assembly side plate 136 can include a vented access plate 139 for heat dissipation and access to the interior of the base body assembly 106. The lens assembly side plate 136 can include a lens adjustment slot 142. The lens adjustment slot 142 can have a length and position that restricts motion of base body lens adjuster handle 118 to prevent the lens and lens holder 127 from impacting the components of the control module 112. The base body lens adjuster handle 118 can also include a securing mechanism such as a screw-down knob, a quick-release lever, or another device that can be manually or electronically moved in order to secure the base body lens adjuster handle 118 in place. For example, the securing mechanism can secure base body lens adjuster handle 118 in place by squeezing or pressing against the lens adjustment slot 142.

Figure 1C:
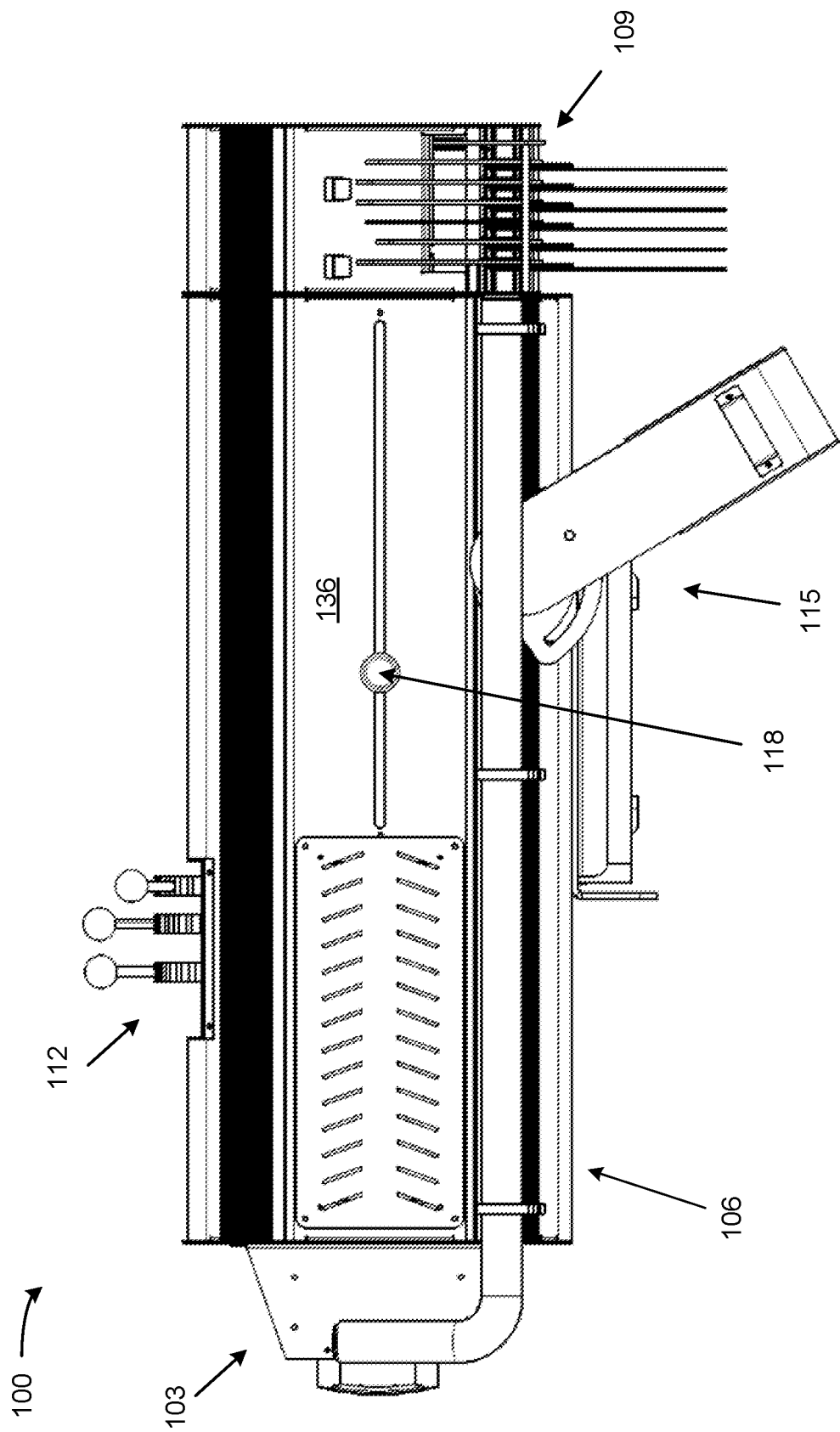

FIG. 1C shows an assembled side view of the modular imaging projector system 100 of FIG. 1A and FIG. 1B. In this example, the modular imaging projector system 100 shows the engine module 103, the lighting effect module 109, the control module 112, and the yoke assembly module 115 assembled to the base body assembly 106. The base body assembly 106 includes the lens assembly side plate 136 and the base body lens adjuster handle 118.

Figure 2:
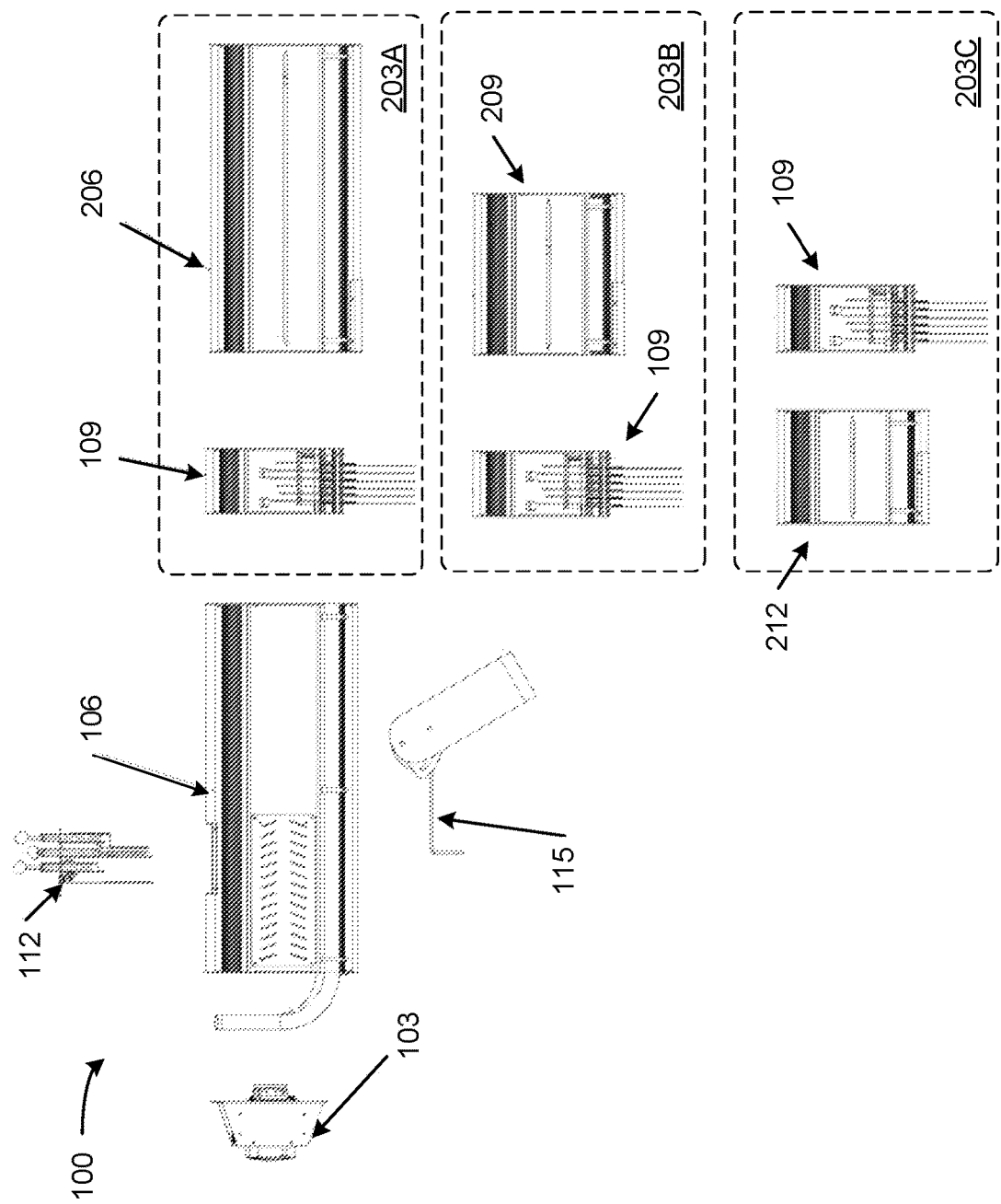
FIG. 2 is a drawing that shows various configurations and accessories for an example modular imaging projector system according to the present disclosure.

FIG. 2 is a drawing that shows various configurations and accessories for a modular imaging projector system 100. For example, the configurations can include a long throw configuration 203A, a medium throw configuration 203B, and a short throw configuration 203C. The long throw configuration 203A can include a lighting effect module 109 that detachably attaches to an anterior connection point of the base body assembly 106 via a posterior connection point of the lighting effect module 109; and a long throw lens tube module 206 that detachably attaches to an anterior connection point of the lighting effect module 109 via a posterior connection point of the long throw lens tube module 206. While the long throw configuration 203A has the long throw lens tube module 206 anterior to the lighting effect module 109, it can alternatively have the lighting effect module 109 anterior to the long throw lens tube module 206.

The medium throw configuration 203B can include a lighting effect module 109 that detachably attaches to an anterior connection point of the base body assembly 106 via a posterior connection point of the lighting effect module 109; and a medium throw lens tube module 209 that detachably attaches to an anterior connection point of the lighting effect module 109 via a posterior connection point of the medium throw lens tube module 209. While the medium throw configuration 203B has the medium throw lens tube module 209 anterior to the lighting effect module 109, it can alternatively have the lighting effect module 109 anterior to the medium throw lens tube module 209.

The short throw configuration 203C can include a short throw lens tube module 212 that detachably attaches to an anterior connection point of the base body assembly 106 via a posterior connection point of the short throw lens tube module 212; and a lighting effect module 109 that detachably attaches to an anterior connection point of the short throw lens tube module 212 via a posterior connection point of the lighting effect module 109. While the short throw configuration 203C has the lighting effect module 109 anterior to the short throw lens tube module 212, it can alternatively have the short throw lens tube module 212 anterior to the lighting effect module 109.

Figure 3:
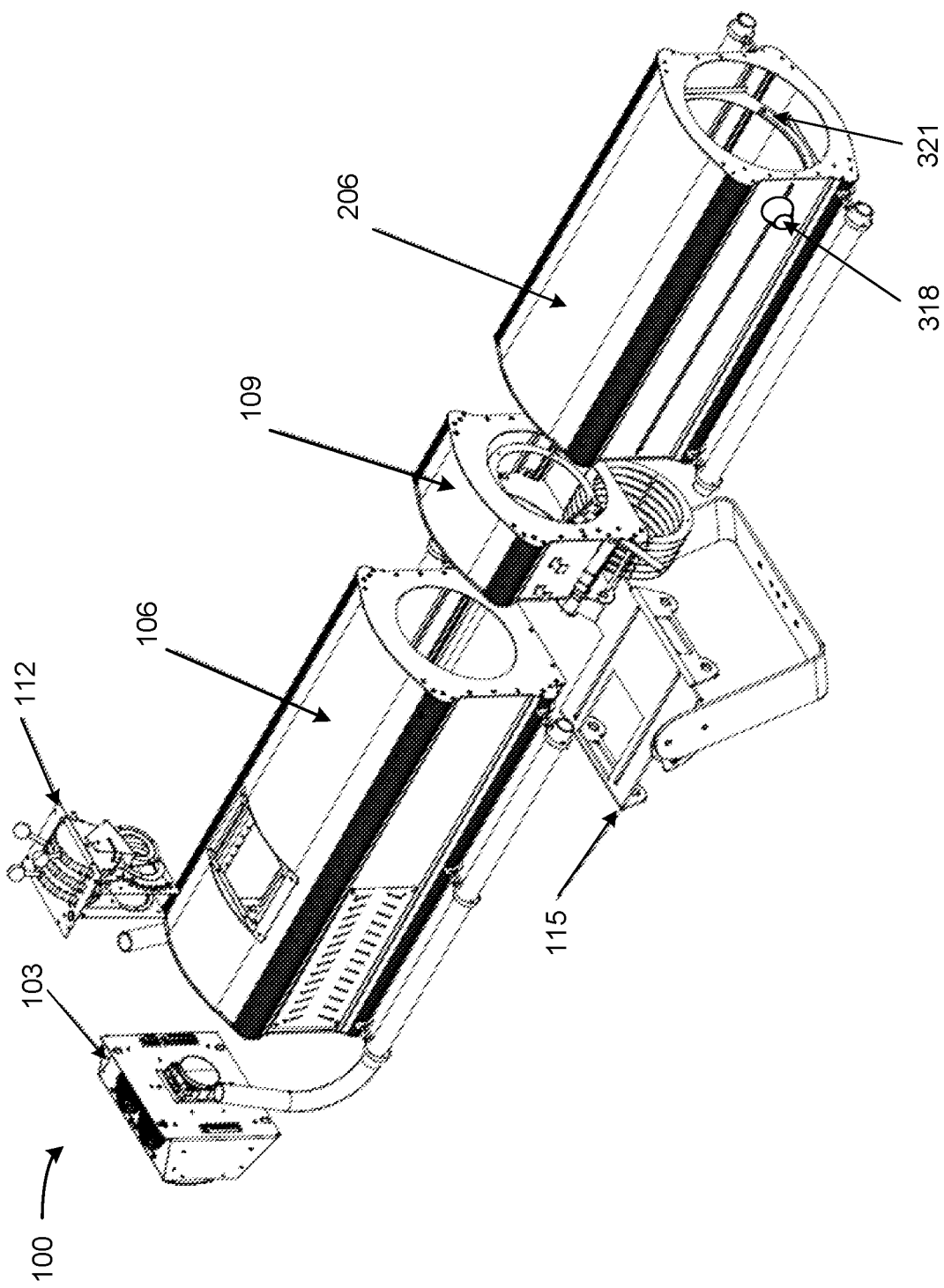
FIG. 3 is a drawing that shows an isometric explosion view of an example modular imaging projector system with a long throw lens, according to the present disclosure.

FIG. 3 shows an isometric explosion view of a modular imaging projector system 100 with a long throw lens tube module 206, corresponding to configuration 203A of FIG. 2. The long throw lens tube module 206 can be used, for example, where the throw is over 150' away to the edge of stage. Long throw lens tube module 206 can include larger diameter openings at each end and a larger diameter and longer focal length lens in order to project the beam in a narrower beam of light, therefore delivering more lumens at a further distance. The long throw lens tube module 206 can be detachably attached to the lighting effect module 109 or the base body assembly 106, and can be removed without disassembly of the base body housing assembly 106 and the LED engine module 103 of the modular imaging projector system 100.

The long throw lens tube module 206 can provide for a full range of motion of a lens tube lens through substantially an entire longitudinal length (e.g., any position along 70% or more, 80% or more, 90% or more) of the long throw lens tube module 206. This can enable alterations to accept smaller or larger gel modules 109 that maintain native adjustments range in the long throw lens tube module 206 without requiring a new lens tube system. To this end, long throw lens tube module 206 can include a housing with a movable lens tube lens set up that has a mechanical lever and/or lens adjuster handle 318 to bring a lens assembly therein into and out of the focal plane, therefore creating an adjustable zoom lens assembly that can enable alterations to accept smaller or larger gel modules that maintain native adjustments range in the lens tubes without requiring a new lens tube system. The lens train or assembly can include a linear track system that runs substantially the entire length of the module for travel.

Long throw lens tube module 206 can include a light blocker for preventing stray light coming out of fixture, a track system of linear rods with bearings attached to a lens holder assembly 321, allowing horizontal adjustment of the lens, depending on desired lens placement in optical system. Attached to lens holder can be a lens adjuster handle 318 which can move the lens holder back and forth and then rotate clockwise in order to lock down the assembly so it stays in place. Alternatively, another motion, such as a rotation of quick-release lever, can lock the device in place. In this example, the lighting effect module 109 is located between the base body assembly 106 and the long throw lens tube module 206. In other cases, the gel 109 can be omitted, or can be mounted anterior to the long throw lens tube module 206.

Figure 4:
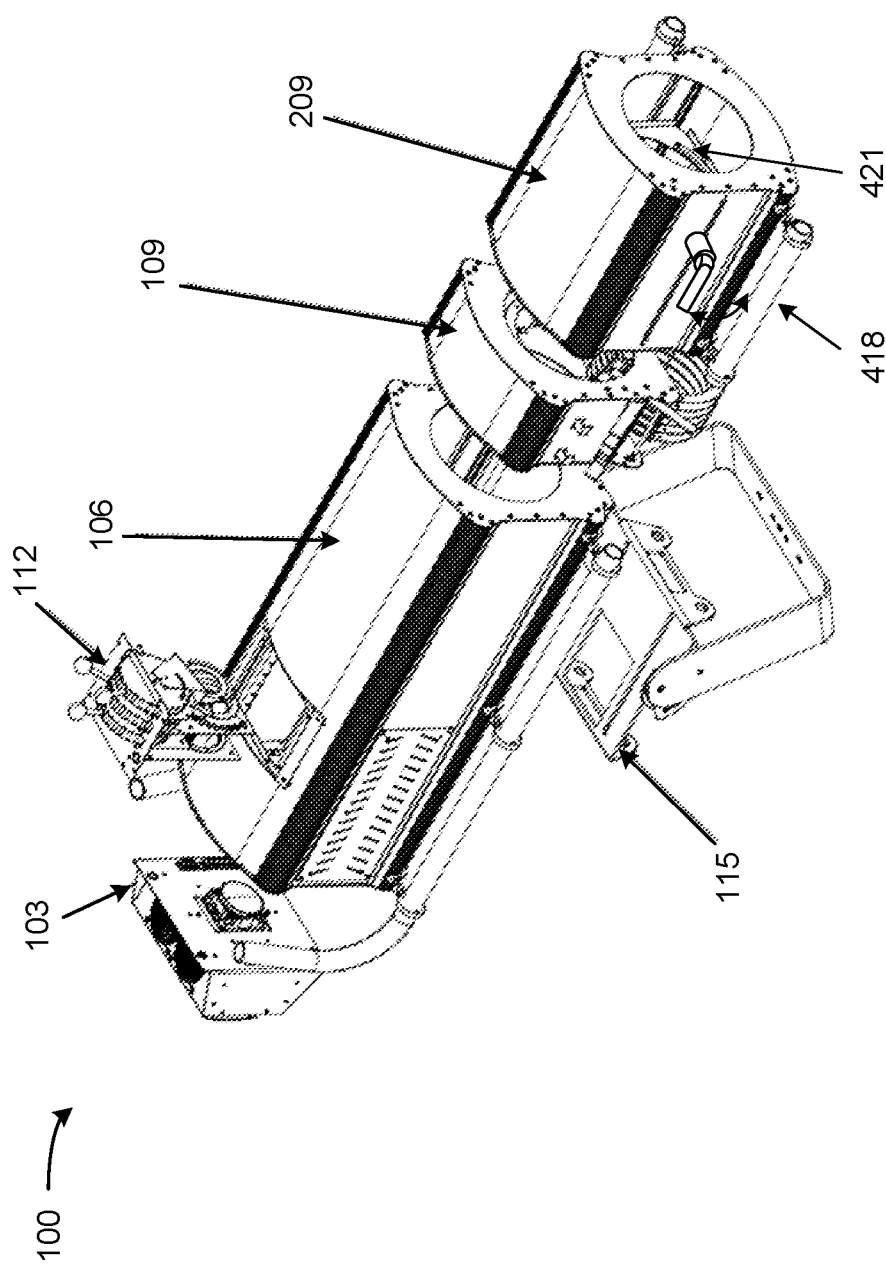
FIG. 4 is a drawing that shows an isometric explosion view of an example modular imaging projector system with a medium throw lens, according to the present disclosure.

FIG. 4 shows an isometric explosion view of a modular imaging projector system 100 with a medium throw lens tube module 209, corresponding to configuration 203B of FIG. 2. The medium throw lens tube module 209 can be detachably attached to the lighting effect module 109 or the base body assembly 106, and can be removed without disassembly of the base body housing assembly 106 and the LED engine module 103 of the modular imaging projector system 100.

The medium throw lens tube module 209 can provide for a full range of motion of a lens tube lens through substantially an entire longitudinal length (e.g., any position along 70% or more, 80% or more, 90% or more) of the medium throw lens tube module 209. This can enable alterations to accept smaller or larger lighting effect modules 109 that maintain native adjustments range in the medium throw lens tube module 209 without requiring a new lens tube system. To this end, medium throw lens tube module 209 can include a housing with a movable lens tube lens set up that has a mechanical lever and/or lens adjuster handle 418 to bring a lens assembly therein into and out of the focal plane, therefore creating an adjustable zoom lens assembly that can enable alterations to accept smaller or larger lighting effect modules that maintain native adjustments range in the lens tubes without requiring a new lens tube system. The lens train or assembly can include a linear track system that runs substantially the entire length of the module for travel.

Medium throw lens tube module 209 can include a light blocker for preventing stray light coming out of fixture, a track system of linear rods with bearings attached to a lens holder assembly 421, allowing horizontal adjustment of the lens, depending on desired lens placement in optical system. Attached to lens holder can be a lens adjuster handle 418 which can move the lens holder back and forth and then lock in place by rotation of a lever mechanism or another locking mechanism.

Figure 5:
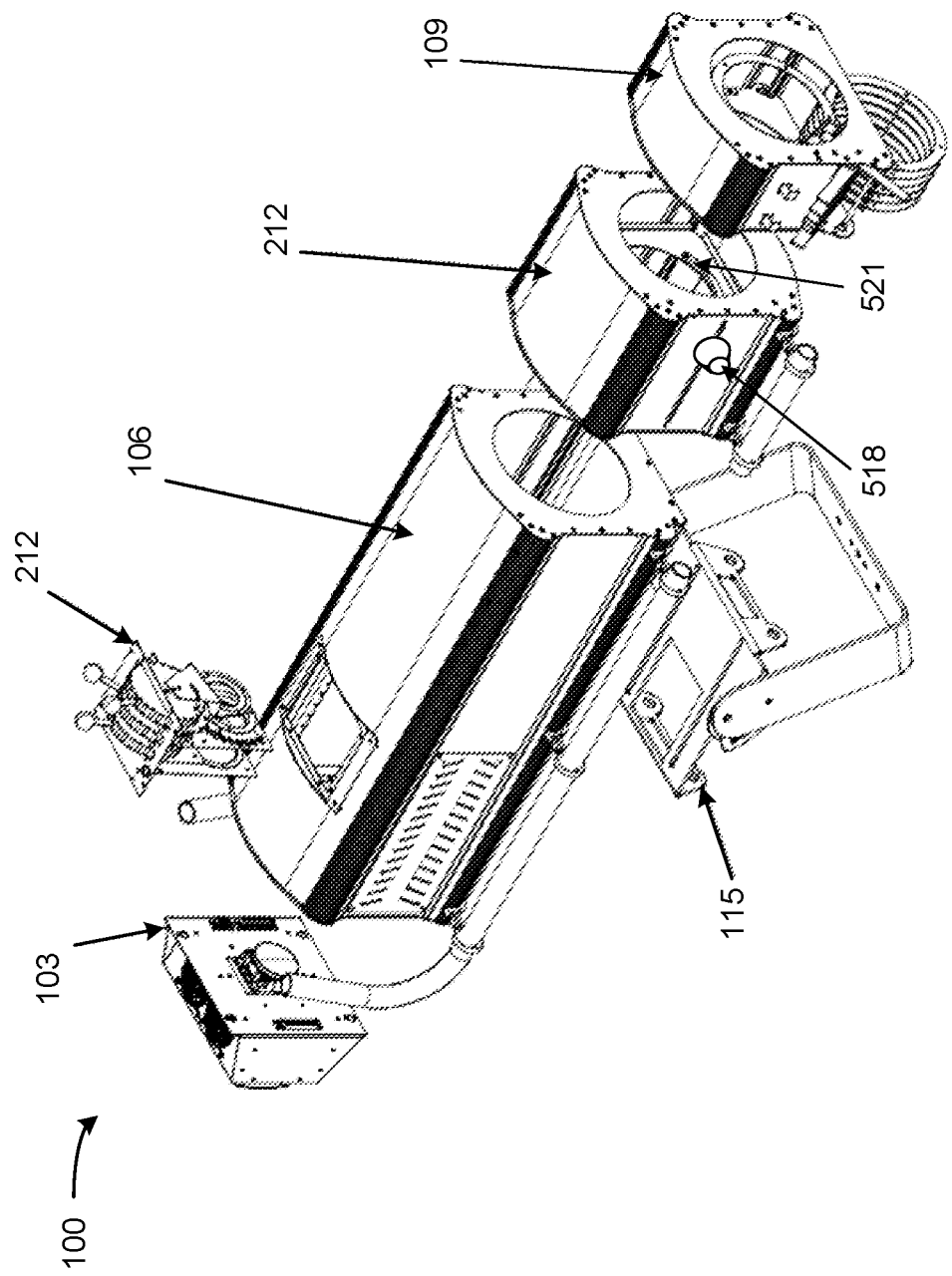
FIG. 5 is a drawing that shows an isometric explosion view of an example modular imaging projector system with a short throw lens, according to the present disclosure.

FIG. 5 shows an isometric explosion view of a modular imaging projector system 100 with a short throw lens tube module 212, corresponding to configuration 203C of FIG. 2. The short throw lens tube module 212 can be detachably attached to the lighting effect module 109 or the base body assembly 106, and can be removed without disassembly of the base body housing assembly 106 and the LED engine module 103 of the modular imaging projector system 100.

The short throw lens tube module 212 can provide for a full range of motion of a lens tube lens through substantially an entire longitudinal length (e.g., any position along 70% or more, 80% or more, 90% or more) of the short throw lens tube module 212. This can enable alterations to accept smaller or larger lighting effect modules 109 that maintain native adjustments range in the short throw lens tube module 212 without requiring a new lens tube system. To this end, short throw lens tube module 212 can include a housing with a movable lens tube lens set up that has a mechanical lever and/or lens adjuster handle 518 to bring a lens assembly therein into and out of the focal plane, therefore creating an adjustable zoom lens assembly that can enable alterations to accept smaller or larger lighting effect modules that maintain native adjustments range in the lens tubes without requiring a new lens tube system. The lens train or assembly can include a linear track system that runs substantially the entire length of the module for travel.

Short throw lens tube module 212 can include a light blocker for preventing stray light coming out of fixture, a track system of linear rods with bearings attached to a lens holder assembly 521, allowing horizontal adjustment of the lens, depending on desired lens placement in optical system. Attached to lens holder can be a lens adjuster handle 518 which can move the lens holder back and forth and then lock in place by rotation of a locking mechanism of the lens adjuster handle 518.

Figure 6:
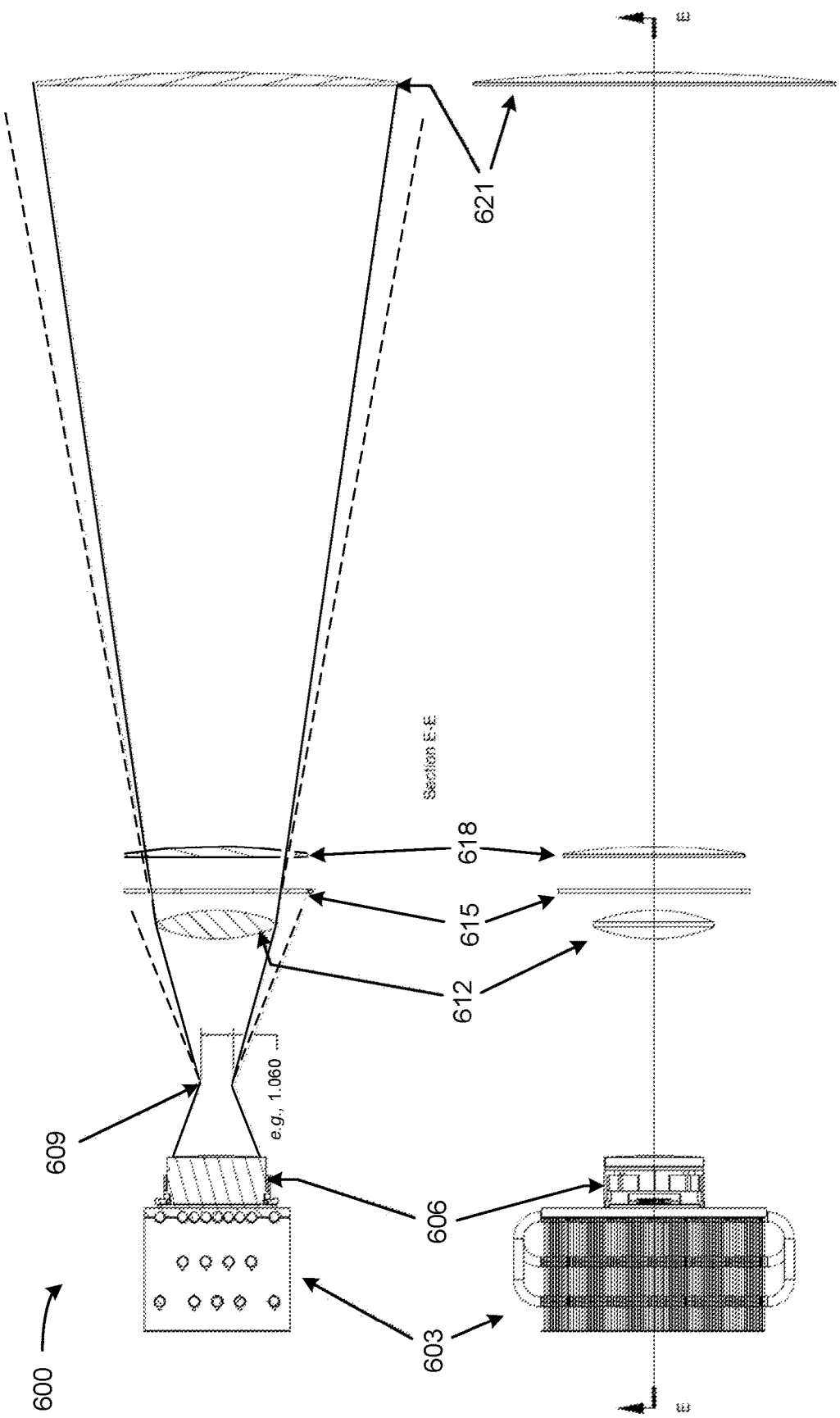
FIG. 6 is a drawing that shows an example optical system for lighting systems including modular imaging projector systems, according to the present disclosure.

FIG. 6 shows an optical system 600 that can be used in a modular imaging projector system 100, as well as other light fixtures and lighting solutions. The optical system 600 can include an LED light source such as one in an LED engine module 103 that can focus and/or homogenize a single or multiple LED sources in a manner that focuses emitted light into a smaller sized aperture uniformly and with a hard edge.

The optical system can include an LED light source that can, independently or in combination with reflection and/or refraction components, focus and homogenize LED light sources into a very narrow focal plane without the use of a physical aperture such as an iris prior to a focal point 609.

The optical system 600 can include heat dissipation components 603. The components can include thermistors, fans, and heatsinks for cooling of an LED light source, as well as temperature sensors monitoring the LED array temperature in order to adjust speed of fans depending on a detected junction temperature of the LED array. In some cases, the heat dissipation components 603 can be housed within an LED engine module 103.

The optical system 600 can include an LED homogenizing module 606. The shown optical system includes an LED homogenizing module 606 that is capable of focusing and homogenizing a single or multiple LED sources into a uniform and hard-edged projection focused on a homogenized focal point 609 without using an iris or other aperture. As a result, the light produced by the LES, LED, or other LED lighting source is not lost, and is focused down on the homogenized focal point 609, for example, in a lossless or approximately lossless manner. In some cases, the LED homogenizing module 606 can include a specialized LED or LES lighting source that independently homogenizes and focuses homogenized light on the homogenized focal point 609. In other cases, the LED homogenizing module 606 can include a set of optics or lenses that focuses and homogenizes light from the LED or LES source light through the homogenized focal point 609.

The homogenized focal point 609 can refer to a focal point where the light beam from the LED light source passes through in a homogenized form. The homogenized focal point 609 can include a predetermined single point in space or a predetermined two-dimensional shape in space through which a light beam passes without an obstructive physical aperture such as an iris. By focusing the homogenized light through the homogenized focal point 609, the light can be projected onto a biconvex, aspherical, or planoconvex optical/refocusing lens 612. The lens 612 can be referred to as a collimating lens since the refocusing lens 612 can refocus the light beam so that it is more collimated (i.e., less divergent) than the light beam passing through the focal point 609 and prior to passing through the refocusing lens 612. The refocusing lens 612 can refocus the light beam that passes through the homogenized focal point 609 to pass through an iris, aperture, or gate 615. In some cases the refocused light beam can be collimated or approximately collimated. For example, the refocusing lens 612 can refocus the light to an infinite or approximately infinite focal point in order to achieve full or approximate collimation.

The refocusing lens 612 and the iris 615 can be included in a control module 112 along with other components. To this end, the control module 112 can include a lens holder submodule or component that is located proximally to the light source with respect to the other submodules of the control module 112 (i.e., between the light source and the other submodules). An optional primary lens 618 can be used. This can be a base body integrated lens that is included in and serviceable through the control module 112 along with the optical/refocusing lens 612, or on a base-body integrated lens assembly 124 that can be moved in a linear fashion as discussed to achieve zooming, focusing, and/or other desired effects. A lens 621 can also be provided. The lens 621 can be a primary lens where the optional basebody-integrated primary lens is not used, or can be a secondary lens. The lens 621 can include those used in a lens tube module.

This optical system 600 offers more light delivered and less light loss than what is provided using existing solutions that are not able to homogenize and focus the amount of light being generated by the LED, where only about half the light being generated by the LED is able to be captured and properly used for the system. The optical system 600 uses an LED or LES system that can focus multiple LEDs into a single low angle homogenous point. In comparison to a standard COB chip this can be somewhere under 60 degree beam spread, under 50 degree beam spread, under 40 degree beam spread, under 30 degree beam spread, and so on, as compared to the 120 degree beam spread from a standard COB chip. The optical system 600 is designed to have as few optical pieces and obstructions in the path of the light as possible, in order to boost ultimate light output. Single or multiple lens groups can be used in order to focus the homogenized light through focal point 609 and ultimately a second focal point at the gate or iris 615. The optical system 600 can omit or lack any aperture or iris type light obstructions in the light path from the light source prior to the biconvex, aspherical, or planoconvex refocusing/optical lens 612. In some cases, the LED light source can be a focused and homogenized LED light source that enables the optical system 600 to omit or lack any refraction, refocusing, and light obstruction components prior to the focal point 609 and the lens 612.

In some examples, the focal length can include 60 mm, or other focal lengths. The diameter of the light emitting surface (LES) for the homogenized section can be 26 mm or approximately 26 mm. Other LES measures can also be utilized. In some examples, a single 100 mm or other size Biconvex (BCX) lens or single aspherical lens can be added in order to collimate the light and have that lens focus on the Focal Point of homogenization, as shown in the Optical System of FIG. 6. Other lens measures can also be utilized. By using a single lens for collimating and focusing this light, the beam can be maintained as narrow as possible on the output side. For example, a 75 mm gate/iris. Other gate/iris measures can also be utilized. A 300 mm diameter long focal length lens can be used as a primary, for example, to the focal plane that is desired for use in the fixture. In other words, crisp edge light, gobo/image projection, and others, with the output of the beam of around 10 degrees, for example, after exiting the BCX lens. This provides a more narrow beam than other optical light sources for LED imaging projectors. Dashed lines can indicate lost light, but are not indicative of an actual scale angle of lost light path. The system provides for very little light loss through Fresnel loss and/or beam angle prior to the focal point 609.

Figure 7:
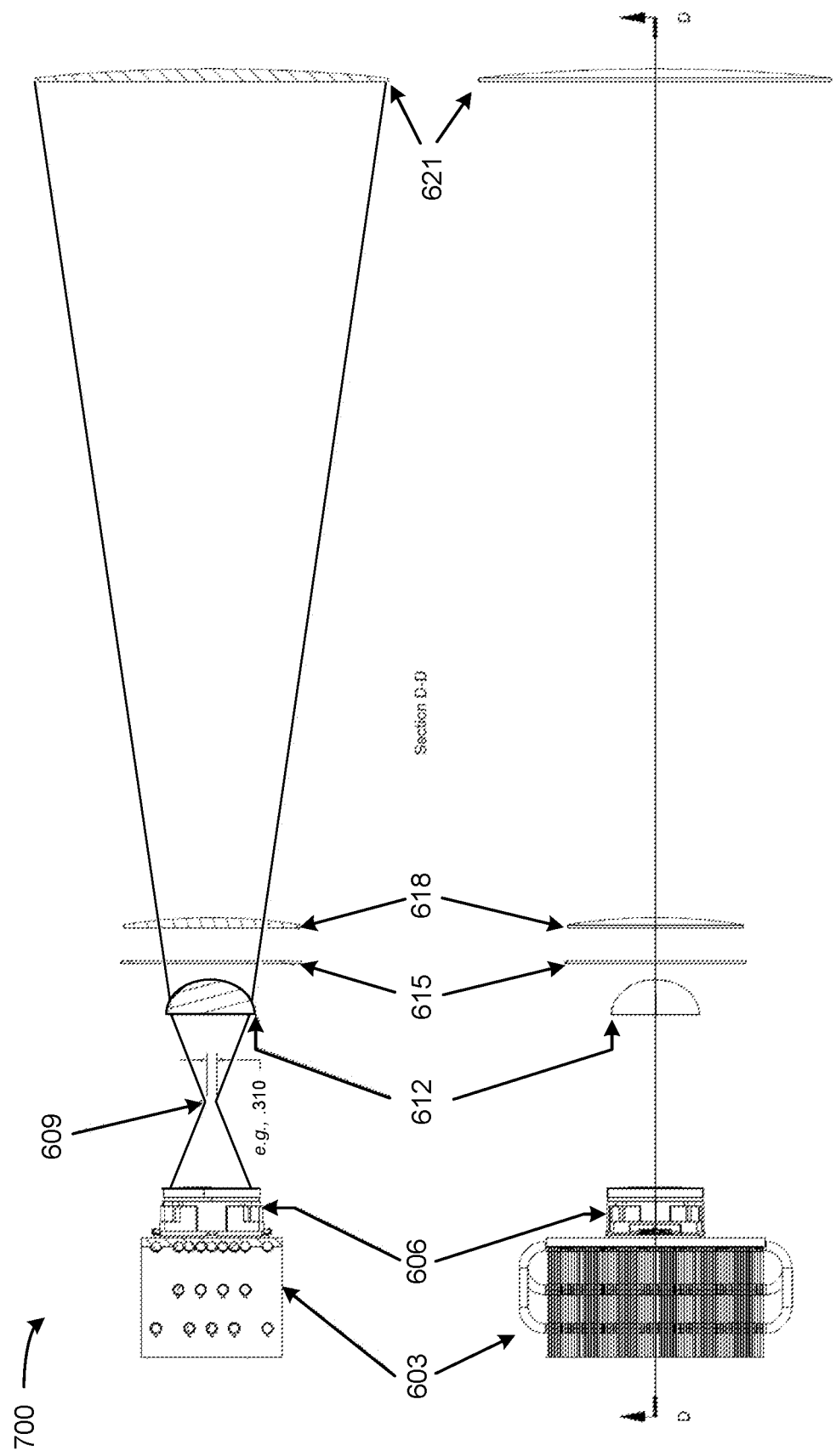
FIG. 7 is a drawing that shows another example optical system for lighting systems including modular imaging projector systems, according to the present disclosure.

FIG. 7 shows an optical system 700 that can be used in a modular imaging projector system 100, as well as other light fixtures and lighting solutions. The optical system 700 shows that a longer focal length of the focal point 609 can increase efficiency of the optical system 700 as compared to existing technologies and the optical system 600. Both optical systems 600 and 700 can also reduce the amount of glass in the system, thereby lowering light output (e.g., by Fresnel Loss) and keeping the image size reduced in order to more effectively focus and homogenize and/or collimate the light for the primary, as well as the secondary lens in the zoom arrangement. For example, this can provide approximately 75% increase in light homogenization and/or collimation over other systems.

Although embodiments have been described herein in detail, the descriptions are by way of example. The features of the embodiments described herein are representative and, in alternative embodiments, certain features and elements may be added or omitted. The term approximately can include an approximation within a tolerance of any of 1%-20%, (e.g., 1%, 2%, 3%, 4%, 5%, 6%, 7%, 8%, 9%, 10%, 11%, 12%, and so on). It is understood that aspects described with respect to a specific figure are applicable to and combinable with aspects described with respect to other figures. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

We claim:

1. A modular imaging projector system, comprising:
   a base body assembly that includes a housing and a plurality of connections points configured to attach to a plurality of modules of the modular imaging projector system;
   a light-emitting diode (LED) engine module detachably attached to a posterior connection point of the base body assembly;
   a removable optical control module detachably attached to a control module connection point comprising a cutout on a particular surface of the housing of the base body assembly, the removable optical control module comprising: a collimating lens held by a lens holder submodule of the removable optical control module, and a plurality of control submodules comprising corresponding physical control mechanisms that extend through the cutout on the particular surface of the housing, wherein one of the physical control mechanisms comprises a gear and a handle that rotates about an axis provided by the gear, and wherein the collimating lens and the gear are installed through the cutout on the particular surface of the housing of the base body assembly; and
   a yoke assembly module attached to a yoke connection point of the base body assembly.

2. The modular imaging projector system of claim 1, further comprising:
   a lighting effect module detachably attached to an anterior connection point of the base body assembly; and
   a lens tube module detachably attached to an anterior connection point of the lighting effect module.

3. The modular imaging projector system of claim 1, further comprising:
   a lens tube module detachably attached to an anterior connection point of the base body assembly.

4. The modular imaging projector system of claim 3, further comprising:
   a lighting effect module detachably attached to an anterior connection point of the lens tube module.

5. The modular imaging projector system of claim 1, wherein the LED engine module and the posterior connection point of the base body assembly are configured to permit replacement of the LED engine module without disassembly of the housing of the base body assembly.

6. The modular imaging projector system of claim 1, wherein the LED engine module comprises a display component comprising a user interface that shows at least one of: hours of LED usage, color temp, color rendering index (CRI), firmware version, and digital multiplex signal (DMX) address.

7. The modular imaging projector system of claim 1, wherein the lens holder submodule is proximal to the LED engine module in relation to the plurality of control submodules.

8. An imaging projector lighting system, comprising:
a base body assembly that includes a housing and a plurality of connections points configured to detachably attach to a plurality of modules of the lighting system; and
a light-emitting diode (LED) engine module detachably attached to a posterior connection point of the base body assembly, the LED engine module comprising a light emitting surface (LES);
a collimating lens within the base body assembly, wherein the collimating lens refocuses a light beam emitted by the LED engine module to reduce divergence, the collimating lens comprising at least one of a biconvex lens, planoconvex, or aspherical lens; and
a removable control module detachably attached to a control module connection point comprising a cutout on a particular surface of the housing of the base body assembly, the removable control module comprising: the collimating lens held by a lens holder submodule of the removable control module, and a plurality of control submodules comprising corresponding physical control mechanisms, wherein one of the physical control mechanisms comprises a gear and a handle that rotates about an axis provided by the gear.

9. The imaging projector lighting system of claim 8, wherein the lens holder submodule is most proximal to the LED engine module among a plurality of submodules of the removable control module.

10. The imaging projector lighting system of claim 8, further comprising:
a lighting effect module detachably attached to an anterior connection point of one of: the base body assembly, or a lens tube module.

11. The imaging projector lighting system of claim 8, further comprising:
a lens tube module detachably attached to an anterior connection point of one of: the base body assembly, or a lighting effect module.

12. The imaging projector lighting system of claim 8, wherein the LED engine module and the posterior connection point of the base body assembly are configured to permit replacement of the LED engine module without disassembly of the housing of the base body assembly.

13. The imaging projector lighting system of claim 8, wherein the LED engine module generates a homogenized light beam focused to pass through a predetermined focal point without a pre-focal-point physical obstructive aperture.

14. The imaging projector lighting system of claim 13, wherein the base body assembly comprises an LED driver circuit for the LED engine module.

15. A lighting system, comprising:
a light-emitting diode (LED) engine module that emits a light beam that is homogenized and focused through a predetermined focal point, wherein the LED engine module is detachably attached to a base body assembly of the lighting system;
a collimating lens that refocuses the light beam emitted by the LED engine module to reduce divergence, wherein the collimating lens is within the base body assembly, and wherein the collimating lens comprises at least one of a biconvex lens, planoconvex, or aspherical lens; and
a removable control module detachably attached to a particular surface of the base body assembly, the removable control module comprising: the collimating lens held by a lens holder submodule of the removable control module, and a plurality of control submodules comprising corresponding physical control mechanisms, and the collimating lens is installed into the lighting system by inserting the collimating lens through a control module cutout in the particular surface of the base body assembly.

16. The lighting system of claim 15, wherein the light beam passes through the collimating lens after the predetermined focal point and without a pre-collimation-lens physical obstructive aperture.

17. The lighting system of claim 15, wherein the collimating lens is held by a lens holder of the removable control module that is detachably attached to the particular surface of base body assembly.

18. The lighting system of claim 17, wherein the removable control module comprises a plurality of optical control submodules, and the lens holder.

19. The lighting system of claim 17, wherein the removable control module comprises a plurality of preformed control submodule placement positions configured to accept a plurality of optical control submodules configured to fit within the preformed control submodule placement positions of the removable control module.

20. The lighting system of claim 15, wherein the base body assembly comprises an integrated lens system comprising a linear track system and a lens that travels along the linear track system within a lens holder attached to a lens adjustment handle, the lens adjustment handle comprising a securing mechanism to secure the lens holder in a selected position along the linear track system.

* * * * *